United States Patent [19]
Urbinati

[11] 4,212,657
[45] Jul. 15, 1980

[54] DEVICE FOR THE REMOVAL OF PARTICLES OF LEAD FROM THE EXHAUST GASES OF A INTERNAL COMBUSTION ENGINE

[75] Inventor: Mario Urbinati, Turin, Italy
[73] Assignee: Fiat Societa per Azioni, Turin, Italy
[21] Appl. No.: 973,293
[22] Filed: Dec. 26, 1978
[30] Foreign Application Priority Data Jan. 16, 1978 [IT] Italy .................... 67069 A/78

[51] Int. Cl.² .................................. B01D 50/00
[52] U.S. Cl. ............................ 55/319; 55/323; 55/332; 55/330; 55/482; 55/DIG. 30
[58] Field of Search ............... 181/281, 231, 270, 272, 181/275, 255; 55/525, 323, 329, 330, 418, 482, 276, DIG. 30, 332, 319, 464; 60/311

[56] References Cited
U.S. PATENT DOCUMENTS

| 752,386 | 2/1904 | Dunlop et al. | 55/DIG. 30 |
| 1,085,203 | 1/1914 | Gipple | 181/281 |
| 1,593,221 | 7/1926 | Ranyard | 55/329 |
| 2,150,768 | 3/1939 | Hedrick | 181/275 |
| 2,213,614 | 9/1940 | Scarritt | 181/255 |
| 2,732,026 | 1/1956 | Folts | 181/272 |
| 3,381,774 | 5/1968 | Stade et al. | 55/276 |
| 3,485,593 | 12/1969 | Lenane et al. | 55/276 |
| 3,815,337 | 6/1974 | Lenane | 55/276 |
| 3,898,064 | 8/1975 | Tao et al. | 55/276 |

Primary Examiner—Frank W. Lutter
Assistant Examiner—Gregory N. Clements
Attorney, Agent, or Firm—Sughrue, Rothwell, Mion, Zinn and Macpeak

[57] ABSTRACT

Pollutant particles, particularly lead particles, are removed from engine exhaust gases by passing the gases successively through three aligned chambers, of which the first and third contain wire mesh or expanded metal packings, while the second chamber is divided by a deflecting baffle which deflects the partially cleaned exhaust gases downwards to deposit particles in the bottom of the second chamber.

4 Claims, 5 Drawing Figures

DEVICE FOR THE REMOVAL OF PARTICLES OF LEAD FROM THE EXHAUST GASES OF A INTERNAL COMBUSTION ENGINE

The present invention relates to a device for the removal of pollutant particles, particularly lead particles, from the exhaust gases of an internal combustion engine.

Devices are already known, for example from U.S. Pat. Nos. 3,485,593 and 3,815,337, in which the contaminated exhaust gases are made to pass successively through a number of chambers designed to filter the gases and trap the major portion of the contaminant particles. Such devices usually comprise an admission chamber suitable for accumulating the exhaust gases, and for passing them with a highly vortical flow to a filtering chamber in which the major portion of the said contaminant particles are filtered out.

The use of such known devices does not, however, ensure satisfactory elimination of the contaminant particles, particularly lead particles.

It is known that in order to obtain constant and satisfactory performance of an internal combustion engine, particularly of a four-stroke Otto cycle engine, it is necessary that the fuel, besides having a good volatility and a high calorific power, should withstand each compression stroke without detonating spontaneously. Such detonation or 'knocking' reduces the power of the engine and generates dangerous stresses on the pistons and on cylinder heads of the engine. To avoid knocking it is common practice to mix an anti-knock additive with the fuel.

The most efficient anti-knock additive, and the one most widely used, is lead tetraethyl, which is usually added in amounts not exceeding 1 $cm^3$ per liter. Lead tetraethyl, however, causes the formation of corrosive deposits of lead oxide in the engine and the dispersion of particles of lead in the engine exhaust gases; the lead content of the exhaust gases renders the gases toxic and increases the atmospheric pollution caused by the gases.

An object of the present invention is to provide a device of the static type which is particularly suitable for effecting gradual separation of the lead particles dispersed in the exhaust gases of an internal combustion engine.

According to the invention there is provided a device for the removal of pollutant particles, particularly lead particles, from the exhaust gases of an internal combustion engine, characterised in that the device comprises first, second and third chambers aligned with each other, through which the exhaust gases flow in succession, the first and third chambers including static means suitable for conglomerating and trapping some of the pollutant particles, and the second chamber including deflector means adapted to deflect downwardly the flow of partially purified gases in order to cause the deposit in the lower part of the second chamber of pollutant particles.

The invention will be further described, by way of non-limiting example, with reference to the accompanying drawings, in which.

Figure 1:
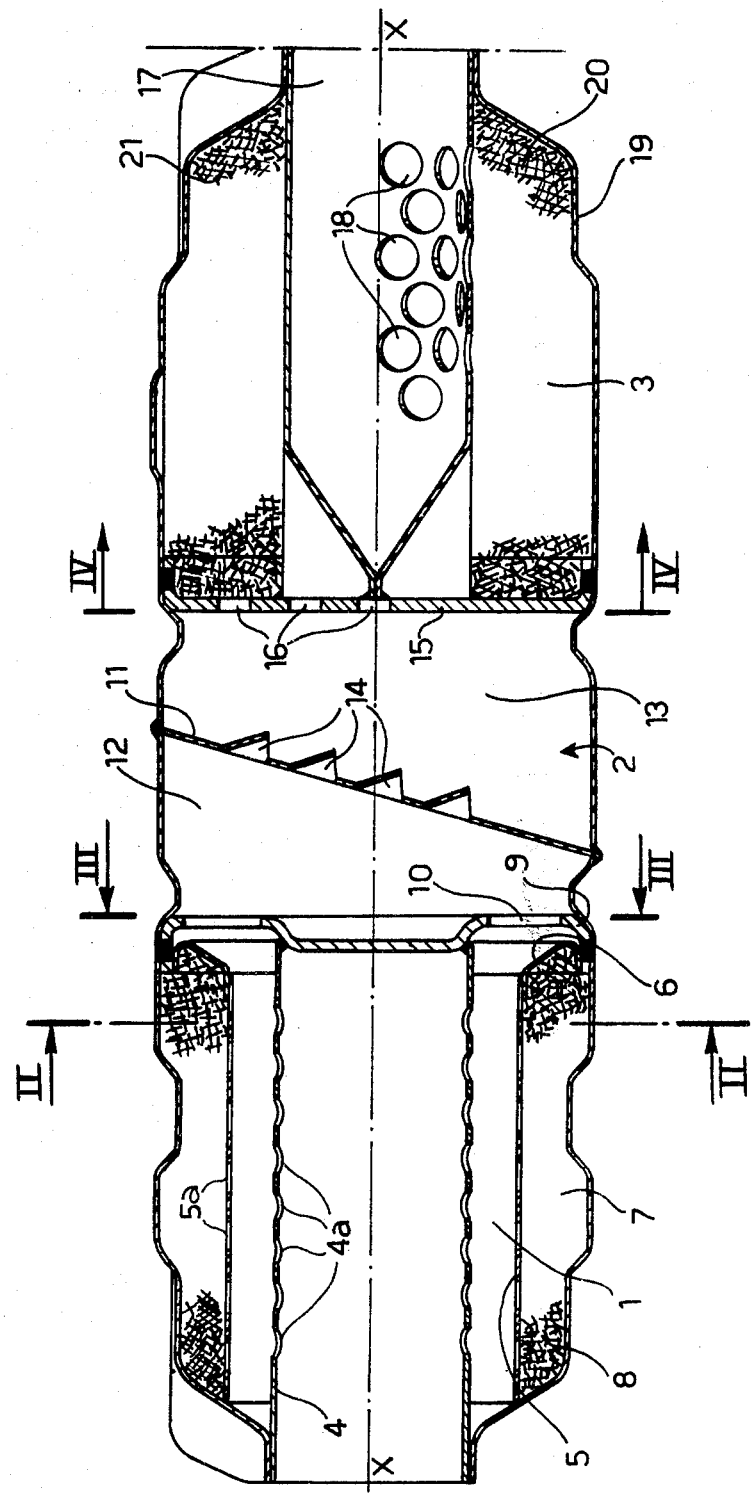
FIG. 1 is a diagrammatic longitudinal section of a device according to one embodiment of the invention.
Figure 2:
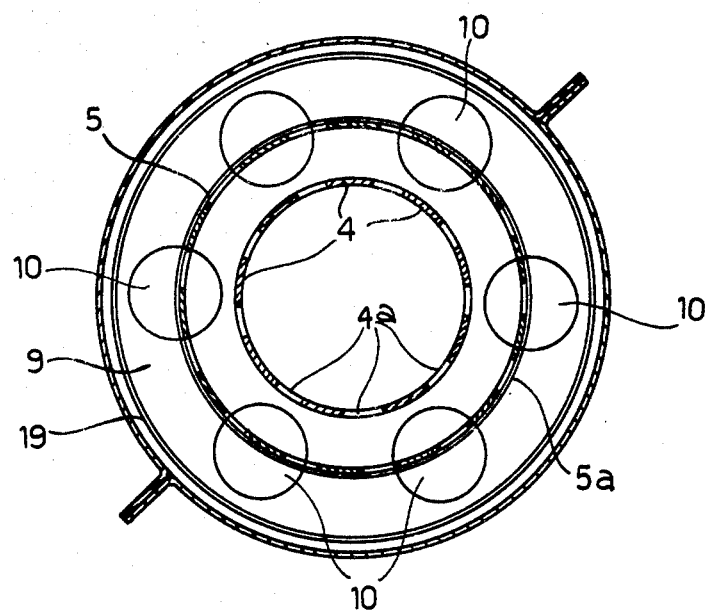
FIGS. 2 to 4 are respective transverse cross-sectional views taken on lines II—II, III—III and IV—IV respectively in FIG. 1.

In the drawings reference numerals 1, 2 and 3 indicate respectively a first, a second and a third chamber within the device.

The first chamber 1 includes an inlet pipe 4 extending axially through it and provided with a plurality of holes 4a within the chamber 1. A hollow cylindrical wall 5 of circular cross section, perforated with a number of holes 5a, surrounds the pipe 4 and defines with the outer wall of the chamber 1 and an annular cup-shaped plate 6 an annular space 7 filled with a porous packing 8 of expanded metal or the like (FIG. 1).

Figure 3:
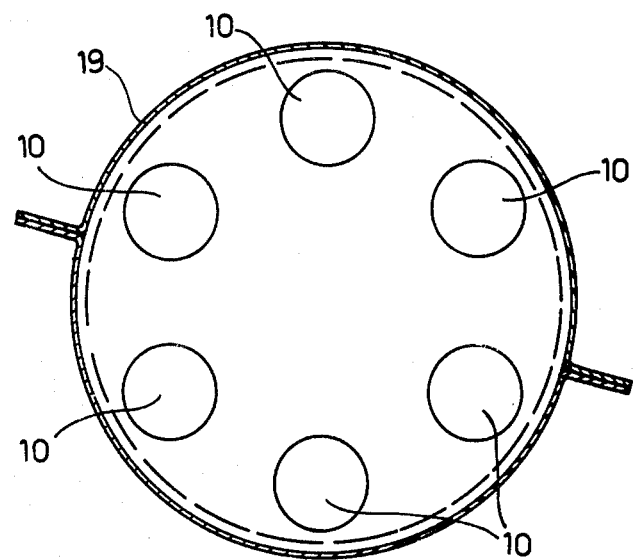

A transverse dividing wall 9 comprising a circular substantially flat disc separates the chamber 1 from the chamber 2 and closes the inner end of the inlet pipe 4, being secured to the latter by welding. Outside the inlet pipe 4 the dividing wall 9 is provided with a circumferential array of holes 10 interconnecting the first and second chambers 1 and 2 (FIG. 3).

A circular partition 11 subdivides the chamber 2 into two compartments 12 and 13. The said partition 11 is formed with a number of rectangular louvre openings 14 interconnecting the two compartments 12 and 13 of the chamber 2. The partition 11 is inclined to the longitudinal axis of the chamber 20, so that in the horizontal installed position of the device the partition slopes longitudinally upwardly in the compartment 12, the louvres 14 being so formed as to deflect exhaust gases downwardly as they pass from the compartment 12 into the compartment 13.

Figure 4:
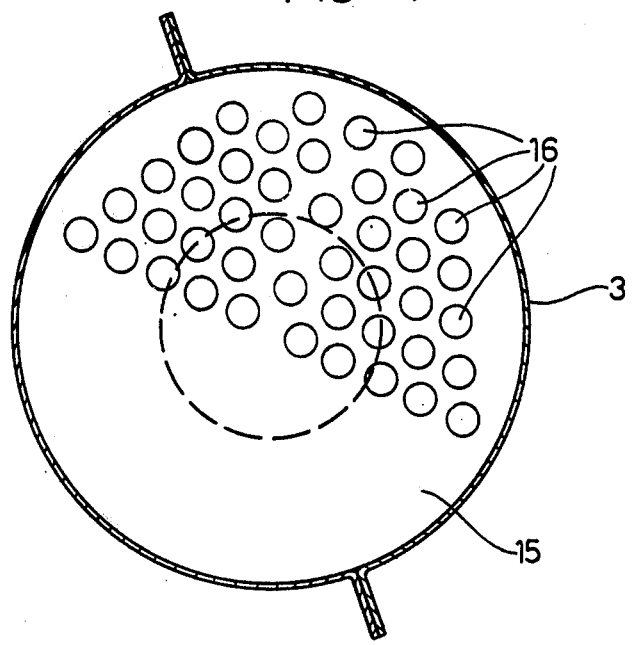
Figure 5:
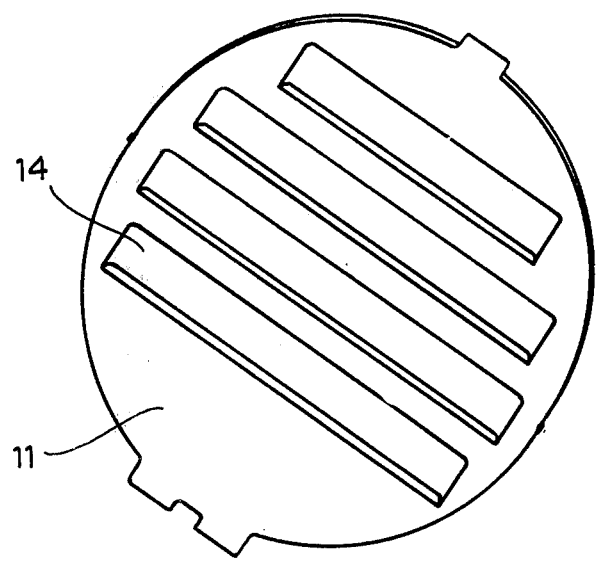
FIG. 5 is a plan view from the downstream end of an internal partition incorporated in the device of FIGS. 1 to 4.

A circular dividing wall 15 separates the said second chamber 2 from the third chamber 3 of the device. The dividing wall 15 is formed with a number of holes 16 in an upper half only of the wall 15 (FIG. 4).

A tubular outlet pipe 17 extends axially through the chamber 3 and has a conical upstream end fixed by welding to the dividing wall 15. The wall of the pipe 17 is provided in its lower medial part with a number of holes 18. A circumferential space 20 surrounding the pipe 17 in the chamber 3 is filled with a packing comprising pieces of expanded metal or the like.

An external casing 19 joins together in a single monolithic structure the first, second and third chambers 1, 2 and 3 of the device.

The operation of the device will now be described.

Contaminated exhaust gases, derived from the combustion of the air/petrol mixture during the combustion stage of an internal combustion engine and containing particles of lead, enter the inlet pipe 4 at high speed and flow radially outwards through the holes 4a into the annular space 7 defined in the chamber 1 between the pipe 4 and the cylindrical wall 5.

The speed of emission of the gases from the holes 4a such that the heavy lead particles in the exhaust gases, through their inertia, impinge violently upon the circular-section cylindrical wall 5.

The cylindrical wall 5 is made of expanded sheet metal of a thickness of some tenths of a millimeter with holes therein of rhomboidal form and such as to allow the passage of about 20% by weight of lead particles contained in the exhaust gases into the packing 8 in the space 7, where the particles are effectively trapped.

The packing 8 in the annular space 7 may for example be formed from fragments of "mesh stocking" made from stainless steel wire, or like material. In the example illustrated, according to the invention, the packing 8 comprises fragments of expanded metal.

The exhaust gases, purified of 20% of the lead particles, pass through the holes 10 in the circular dividing wall 9 into the compartment 12 of the second chamber 2.

The slope of the partition 11, combined with the inclination of the rectangular louvres 14, which function as deflectors, serves to deflect the exhaust gases, in their passage through the louvres 14 from the compartment 12 to the compartment 13, downwardly towards the lower part of the said compartment 13. The longitudinal slope of the partition 11 may be between 10° and 20° to a plane normal to the longitudinal axis x—x of the device. In the embodiment illustrated in FIG. 1 the said slope is 15°.

The inclination of the deflecting surfaces of the louvres 14 in the partition 11 may be between 30° and 40° to the plane of the partition 11. In the illustrated embodiment, this angle of inclination is 35°.

The deflection of the exhaust gases passing through the louvres 14 towards the bottom of the compartment 13 exploits the effect of gravity and deposits on the bottom of the compartment 13 a further 40% by weight of the original lead particle content of the exhaust gases.

Subsequently the exhaust gases, containing the remaining 40% of the lead particles, flow through the holes 16 in the upper part of the dividing wall 15 into the circumferential space 20 in the third chamber 3 of the device. The presence of the packing 21 of expanded metal in the circumferential space 20 encourages diffusion of the contaminated gases into the said packing, resulting in the agglomeration of the lighter contaminant particles and subsequent trapping of these particles, including the remaining 40% of the said lead particles, in the packing 21.

The circumferential space 20 may alternatively be filled with fragments of "mesh stocking" made of stainless steel wire or with other equivalent packings without effecting the efficiency of the exhaust gas filtering.

The exhaust gases, substantially purified of lead particles, pass through the holes 18 in the lower medial longitudinal part of the outlet pipe 17 into the pipe 17, through which the gases are discharged into the atmosphere.

A first very important advantage of the static device according to the invention is that of exploiting the properties of particular packing materials, for example the fragments of expanded sheet metal or the fragments of stainless steel wire "mesh stocking" for the purpose of providing static "traps" to retain the said contaminant particles.

A second advantage of the device according to the invention is that it enables the exhaust gases to be cleaned in successive stages, as described above, by the removal of successive fractions of the lead particles and other contaminants from the exhaust gases.

I claim:

1. A device for the removal of pollutant particles, particularly lead particles, from the exhaust gases of an internal combustion engine, comprising in combination:
    a casing having internal subdivision means defining first, second and third chambers aligned with each other, said second chamber communicating both with said first and third chambers through openings of said internal subdivision means and said first and third chambers being respectively provided with an exhaust gas inlet and an exhaust gas outlet, so that the exhaust gases can flow in succession through said first, second and third chambers,
    a metallic filler within said first and third chambers for conglomerating and trapping some of the pollutant particles,
    a partition extending across said second chamber in a plane inclined to a transverse plane orthogonal to the longitudinal axis of the device at an angle of between 10° and 20°, said partition having its upper half closer to said third chamber and its lower half closer to said first chamber and being provided with a plurality of apertures having downwardly deflecting louvres which have deflecting surfaces inclined to the plane of the partition at an angle of between 30° and 40°, so as to be adapted to deflect downwardly the flow of partially purified gases coming from the first chamber in order to close the deposition of pollutant particles in the bottom of the second chamber.

2. A device as defined in claim 1, wherein said exhaust gas outlet communicates with an exhaust gas outlet pipe extending axially within the third chamber and defining with said casing a circumferential space containing said metallic filler, said internal subdivision means including a dividing wall between said second and third chambers which is provided only in its upper portion with a plurality of holes to allow the partially purified exhaust gases coming from the second chamber to flow into said circumferential space, said outlet pipe being closed at its end projecting towards the second chamber and having a wall which is provided with a number of holes in its lower medial part to allow the purified exhaust gases to flow from said circumferential space in said pipe.

3. Device as defined in claim 1, wherein said metallic filler in said first and third chambers for trapping the contaminant particles is comprised of fragments of expanded metal.

4. Device as defined in claim 1, wherein said metallic filler in said first and third chambers for trapping the contaminant particles is comprised of stainless steel wire mesh.

* * * * *